(12) United States Patent
Ito et al.

(10) Patent No.: US 8,249,443 B2
(45) Date of Patent: Aug. 21, 2012

(54) IMAGE PICKUP APPARATUS WITH BACK FOCUS ADJUSTMENT MECHANISM

(75) Inventors: Toshiaki Ito, Toyonaka (JP); Shinichiro Okamura, Shijonawate (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 1 day.

(21) Appl. No.: 12/877,531

(22) Filed: Sep. 8, 2010

(65) Prior Publication Data

US 2011/0058804 A1    Mar. 10, 2011

(30) Foreign Application Priority Data

Sep. 8, 2009   (JP) .................................. 2009-207223

(51) Int. Cl.
*G03B 7/099*    (2006.01)
(52) U.S. Cl. ........................................ 396/275; 348/342
(58) Field of Classification Search .................. 396/439, 396/275; 348/342
See application file for complete search history.

(56) References Cited

U.S. PATENT DOCUMENTS

| | | | | |
|---|---|---|---|---|
| 5,838,374 A | * | 11/1998 | Kikuchi | 348/351 |
| 6,788,891 B1 | * | 9/2004 | Mitsugi | 396/144 |

FOREIGN PATENT DOCUMENTS

| | | | |
|---|---|---|---|
| CN | 201134854 Y | * | 10/2008 |
| JP | 2000162668 | | 6/2000 |
| JP | 2000184262 | | 6/2000 |
| JP | 2005318237 | | 11/2005 |

OTHER PUBLICATIONS

Translation of JP Publication No. 2000-162668; Title: Color/Monochrome Switchable Type Camera; Inventor: Imaki et al.; Publication Date: Jun. 16, 2000.*
Translation of JP Publication No. 2005-318237; Title: Color/Monochrome Switching Camera; Inventor: Imaki, Koji; Publication Date: Apr. 28, 2004.*
Translation of CN 201134854; Title: Video Camera Capable of Automatically Adjusting Back Focal Length; Inventor: Guo et al.; Publication Date: Oct. 15, 2008.*

* cited by examiner

*Primary Examiner* — W. B. Perkey
*Assistant Examiner* — Fang-Chi Chang
(74) *Attorney, Agent, or Firm* — NDQ&M Watchstone LLP (57) ABSTRACT

An image pickup apparatus according to the present invention includes an apparatus body including an image sensor built therein, and a lens unit, the apparatus body is provided with a back focus adjustment mechanism and a sliding member which is slidable in a direction perpendicular to an optical axis of the image sensor, the sliding member is provided with an infrared blocking filter and a dummy glass plate arranged next to each other, the apparatus is capable of switching modes between a day photographing mode in which the infrared blocking filter is positioned on the optical axis of the image sensor and a night photographing mode in which the dummy glass plate is positioned on the optical axis of the image sensor, and the dummy glass plate has a thickness greater than a thickness with which optical path length extension equivalent to that with the infrared blocking filter is obtained.

4 Claims, 12 Drawing Sheets

LASER BEAM

IMAGE PICKUP APPARATUS WITH BACK FOCUS ADJUSTMENT MECHANISM

The Japanese patent application Number 2009-207223, upon which this patent application is based, is hereby incorporated by reference.

BACKGROUND OF THE INVENTION

1. Field of the Invention

The present invention relates to an image pickup apparatus comprising an image sensor such as CCD or CMOS image sensor, and particularly to an image pickup apparatus with a back focus adjustment mechanism for adjusting a distance (back focus) from a lens to the image sensor.

2. Description of Related Art

In a monitoring camera with interchangeable lenses (CS mount), a lens unit including a lens is detachably attached to a lens mount section of a camera body which is provided therein with an image sensor such as a CMOS image sensor, and the lens unit is exchangeable. The camera of this kind is equipped with a back focus adjustment mechanism for adjusting back focus when exchanging the lens unit or the like.

When photographing in daytime using a camera, the light taken in through the lens includes visible light and near infrared rays. Since the near infrared component makes images reddish, the near infrared component needs to be removed from the light taken in through the lens. In contrast, when photographing in nighttime, the light taken in through the lens includes almost no visible light, and therefore, the near infrared component needs to be taken in to enhance sensitivity.

Therefore, a sliding member which is slidable in a direction perpendicular to an optical axis of the image sensor is arranged in front of the image sensor, and the sliding member is provided with an infrared blocking filter and a dummy glass plate arranged next to each other along its sliding direction. When photographing in daytime, the sliding member is moved to a day photographing position where the infrared blocking filter is positioned on the optical axis of the image sensor, and when photographing in nighttime, the sliding member is moved to a night photographing position where the dummy glass plate is positioned on the optical axis of the image sensor.

In such a day and night switching camera, when photographing in daytime, the light taken in through the lens passes through the infrared blocking filter before entering the image sensor, and when photographing in nighttime in contrast, the light taken in through the lens passes through the dummy glass plate before entering the image sensor. However, since wavelength of light which enters the image sensor is different between day and night, focal point of the lens is different between daytime photographing and nighttime photographing, resulting in focus displacement. Therefore, the dummy glass plate is designed so as to have a thickness with which optical path length extension equal to that with the infrared blocking filter is obtained.

For example, in the case of employing an infrared blocking filter having a thickness of 2.78 mm and a dummy glass plate having a thickness of 2.88 mm, an optical path length extension $\lambda'$ with the infrared blocking filter is obtained as follows, where refraction index n1 is 1.5443.

$$\lambda' = (1 - 1/n1) * 2.78 = 0.9798 \text{ mm}$$

Whereas, an optical path length extension $\lambda d'$ with the dummy glass plate is obtained as follows, where refraction index n2 is 1.5163.

$$\lambda d' = (1 - 1/n2) * 2.88 = 0.980 \text{ mm}$$

Therefore, the optical path length when the infrared blocking filter intervenes in the optical path and the optical path length when the dummy glass plate intervenes in the optical path are equivalent, and the displacement of imaging plane position due to switching the photographing modes is negligible.

Figure 17A:
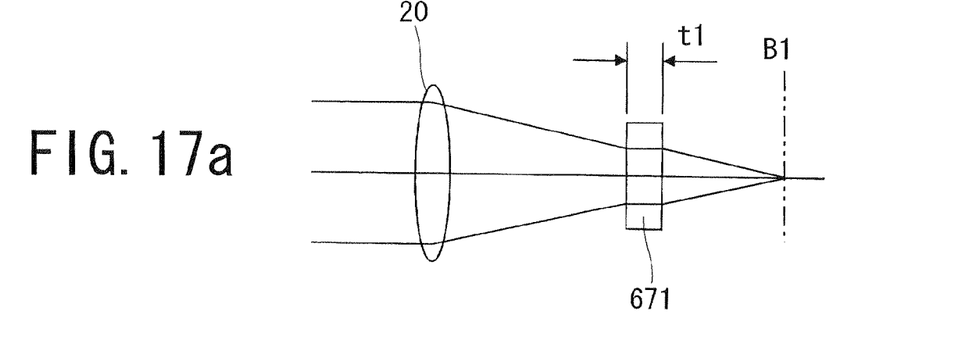
FIG. 17a and FIG. 17b show an imaging plane position in the day photographing mode and an imaging plane position in the night photographing mode, respectively.
Figure 17B:
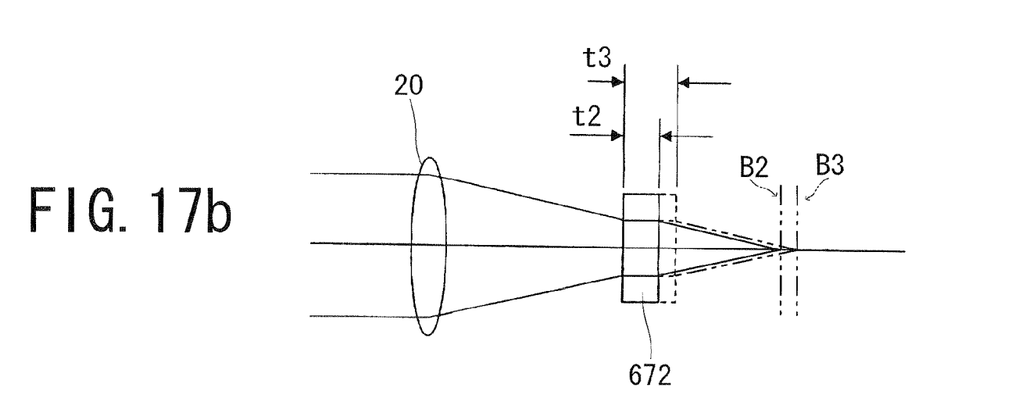

As shown in FIG. 17a, when photographing in daytime, the light which has passed a lens 20 further passes an infrared blocking filter 671 and forms an image on an image surface B1. In contrast, as shown in FIG. 17b, when photographing in nighttime, the light which has passed the lens 20 further passes a dummy glass plate 672 and forms an image on an imaging plane B2. As described above, by adjusting the thickness of the dummy glass plate 672, the imaging plane 32 in the nighttime photographing mode is set at generally the same position as that of the imaging plane 31 in the daytime photographing mode.

Although the imaging plane B2 in the nighttime photographing mode is set at generally the same position as that of the imaging plane 31 in the daytime photographing mode as described above, since there are assembly errors or the like in an actual camera, when the daytime photographing mode is switched to the nighttime photographing mode, back focus is adjusted by a back focus adjustment mechanism to correct deviation from the back focus in the daytime photographing mode (deviation of optical path length).

Figure 16:
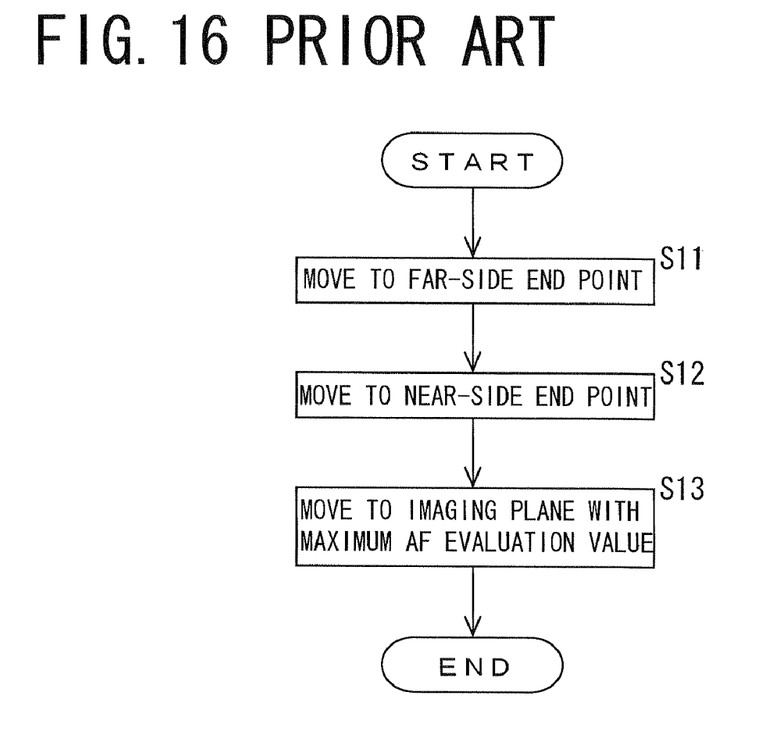
FIG. 16 is a flow chart showing a conventional back focus adjustment procedure.

In back focus adjustment in a conventional camera at the time of switching modes, as shown in FIG. 16 for example, first in step S11, back focus is changed to move the imaging plane position from an origin position (an imaging plane position set in back focus adjustment in the daytime photographing mode) to a FAR-side end point (an end point in a variable range of the back focus farther from the lens). In this process, an AF evaluation value (high frequency component of an image signal output from a CMOS image sensor) is sampled while correlated with a rotation angle of a drive motor at a constant period.

Subsequently in step S12, the back focus is changed to move the imaging plane position from the FAR-side end point to a NEAR-side end point (an end point in a variable range of the back focus nearer to the lens) via the origin point. In this process, an AF evaluation value is sampled while correlated with a rotation angle of a drive motor at a constant period.

And then in step S13, the back focus is changed to move the imaging plane position from the NEAR-side end point to an imaging plane position where the maximum AF evaluation value among sampled AF evaluation values is obtained, and the back focus adjustment procedure ends.

However, in a case where, for example, the distance from the FAR-side end point to the NEAR-side end point is 1 mm and moving speed of the imaging plane position is 0.1 mm/s, it takes 5 seconds to complete step S11 of FIG. 16, 15 seconds to complete step S12, and approximately 20 seconds to complete step S13. Thus, there is a problem of taking as long as approximately 20 seconds for back focus adjustment.

SUMMARY OF THE INVENTION

The present invention is to provide an image pickup apparatus which can shorten time required for back focus adjustment to be performed at the time of switching from the daytime photographing mode to the nighttime photographing mode.

An image pickup apparatus according to the present invention comprises an apparatus body including an image sensor built therein, and a lens unit detachably attached to an aperture opening on a front surface of the apparatus body. The apparatus body is provided with a back focus adjustment mechanism and a sliding member which intervenes between the aperture and the image sensor and is slidable in a direction perpendicular to an optical axis of the image sensor, the sliding member is provided with an infrared blocking filter and a dummy glass plate arranged next to each other along a sliding direction, and the image pickup apparatus can switch a mode between a day photographing mode in which the infrared blocking filter is positioned on the optical axis of the image sensor and a night photographing mode in which the dummy glass plate is positioned on the optical axis of the image sensor.

The dummy glass plate has a thickness t3 greater than a thickness t2 with which optical path length extension equivalent to that obtained with an infrared blocking filter having a predetermined thickness t1 is obtained.

In a particular embodiment, the back focus adjustment mechanism automatically changes back focus using a motor as a power source.

In a case where the night photographing mode is set in the image pickup apparatus of the present invention, light taken in through a lens of the lens unit passes through the dummy glass plate before entering an imaging plane of the image sensor. Since the dummy glass plate has the thickness t3 greater than the thickness t2 with which optical path length extension equivalent to that obtained with an infrared blocking filter having the predetermined thickness t1 is obtained, the imaging plane is formed at a position further from the lens than that in a case where the dummy glass plate has the thickness t2 with which obtained is optical path length extension equivalent to that obtained with the infrared blocking filter having the predetermined thickness t1.

Therefore, in the image pickup apparatus of the present invention described above, the back focus adjustment by the back focus adjustment mechanism at the time of switching from the day photographing mode to the night photographing mode can be performed with procedure of searching an imaging plane position where the maximum focus evaluation value is obtained in a process of moving an imaging plane position from one end point to the other end point of a searching scope including a theoretical (calculated) imaging plane position in a case where the dummy glass plate having the thickness t3 intervenes in the optical path.

More specifically, the back focus adjustment is performed by moving the imaging plane position from the one end point which is an imaging plane position (origin position) set in the back focus adjustment in the day photographing mode to the other end point in a direction away from the lens.

As described above, with the image pickup apparatus of the present invention, since the back focus adjustment by the back focus adjustment mechanism at the time of switching from the day photographing mode to the night photographing mode is performed by moving the imaging plane position from an imaging plane position set in the back focus adjustment in the day photographing mode in one direction, the back focus can be adjusted in shorter time than in the conventional image pickup apparatus in which the imaging plane position reciprocates in both approaching and separating directions with the imaging plane position set in the back focus adjustment in the day photographing mode as a center.

DETAILED DESCRIPTION OF THE PREFERRED EMBODIMENT

Figure 1:
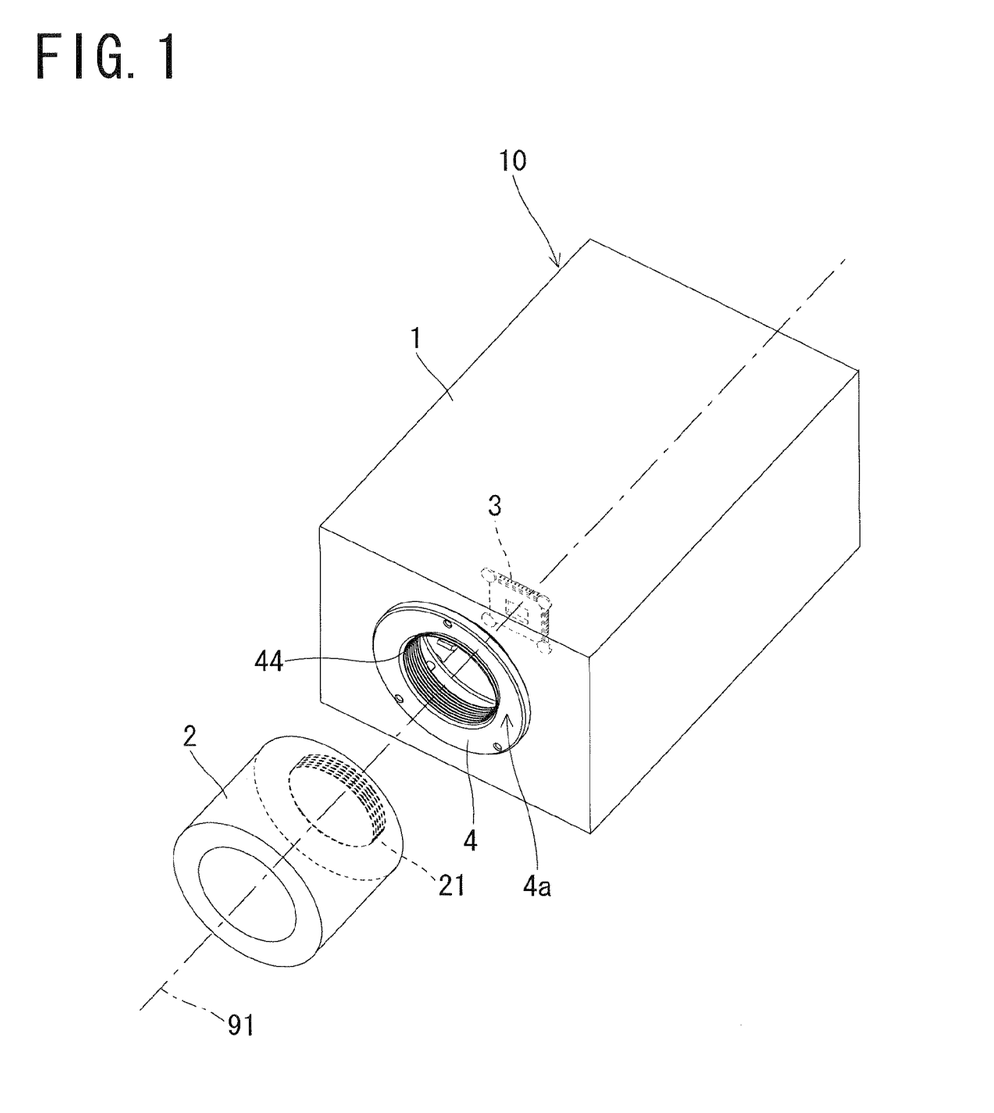
FIG. 1 is a perspective view of a camera body with a lens unit detached therefrom.
Figure 2:
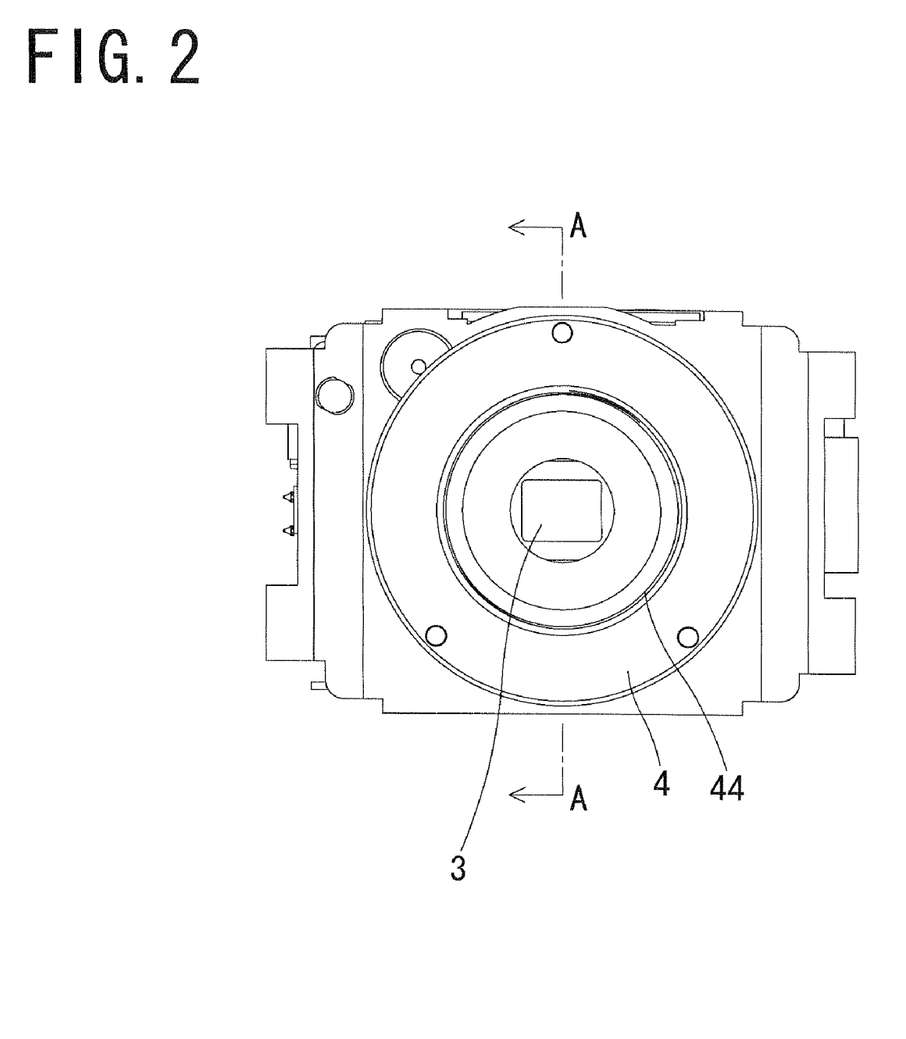
FIG. 2 is a front view of an assembly of the camera body seen from the front side.

In a preferred embodiment discussed in detail below with reference to drawings, the present invention is implemented in a monitoring camera with interchangeable lenses (CS mount). As shown in FIG. 1, a monitoring camera 10 according to the present invention comprises a camera body 1 provided therein with a CMOS image sensor 3 and a lens unit 2 for lens exchange.

Figure 3:
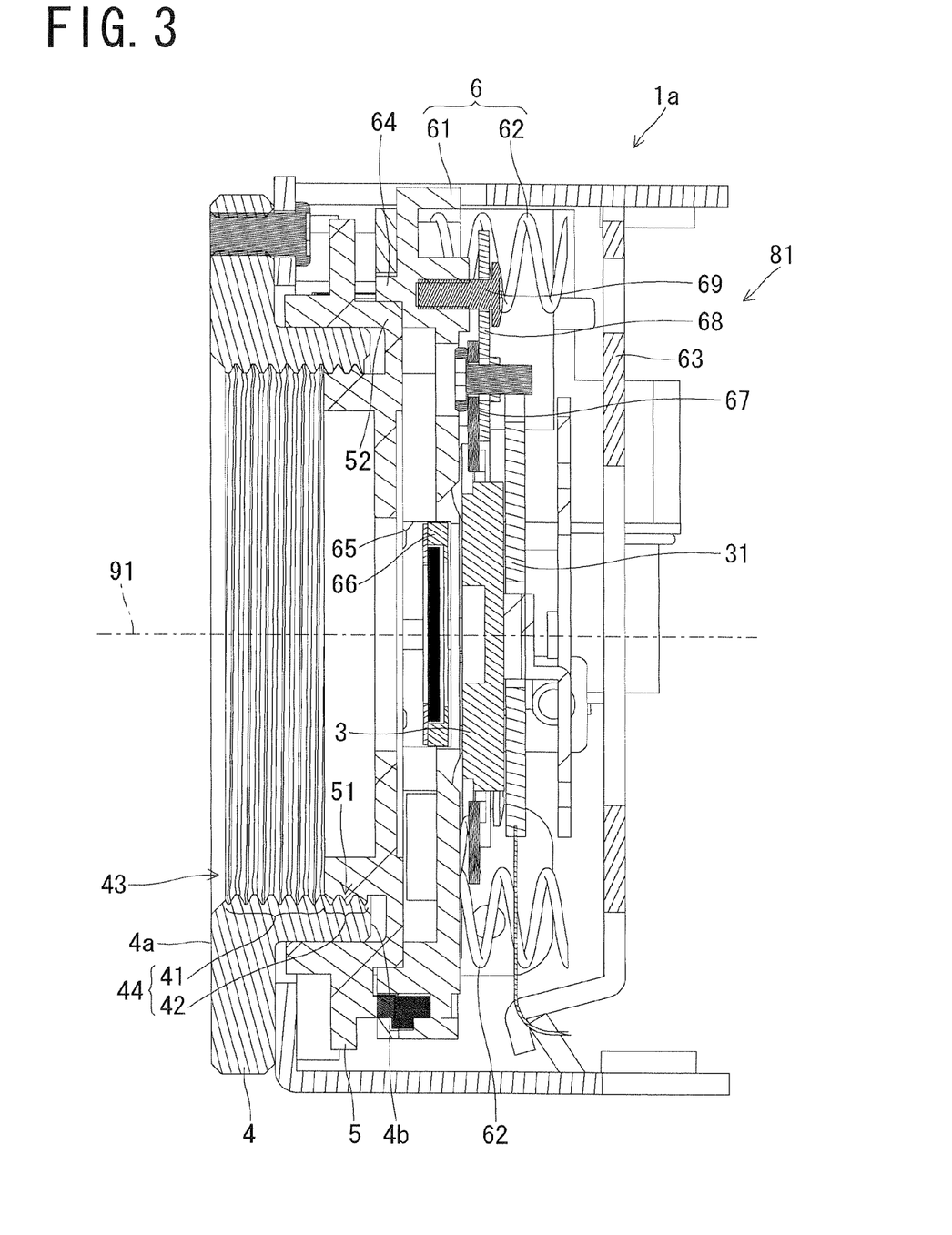
FIG. 3 is a cross sectional view taken along the line A-A of FIG. 2.

A mount section 4 for attaching the lens unit 2 is arranged on a front side of the camera body 1, and is provided with a through-hole 43 passing therethrough from its front surface 4a to a rear surface 4b, as shown in FIG. 3. A female screw 44 is formed on an inner surface of the through-hole 43.

In contrast, as shown in FIG. 1, the lens unit 2 is provided with a male screw section 21 for threadedly engaging with the female screw 44 of the mount section 4 from the front surface 4a side of the mount section 4. The male screw section 21 has such a length that it can threadedly engage with only a partial area of the female screw 44 on the front surface 4a side, and the female screw 44 has an area which does not threadedly engage with the male screw section 21 of the lens unit 2 when the lens unit 2 is attached to the mount section 4.

Thus, the female screw 44 of the mount section 4 comprises a female screw part 41 forming the area which threadedly engages with the male screw section 21 of the lens unit 2 and a second female screw part 42 forming the area which does not threadedly engage with the male screw section 21 of the lens unit 2, and the second female screw part 42 is continuous with the female screw part 41.

Figure 4:
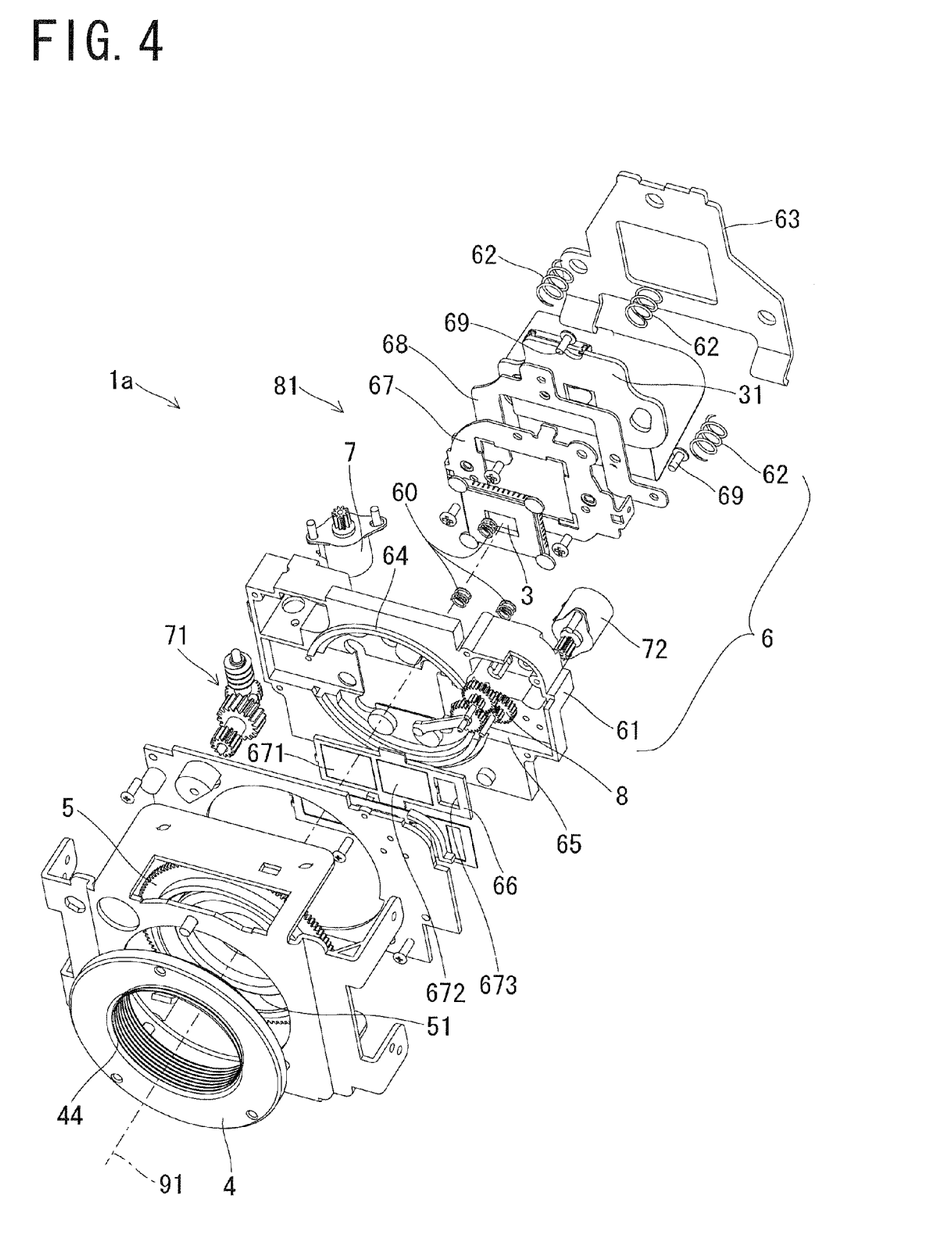
FIG. 4 is an exploded perspective view of the assembly of the camera body seen from the front side.
Figure 5:
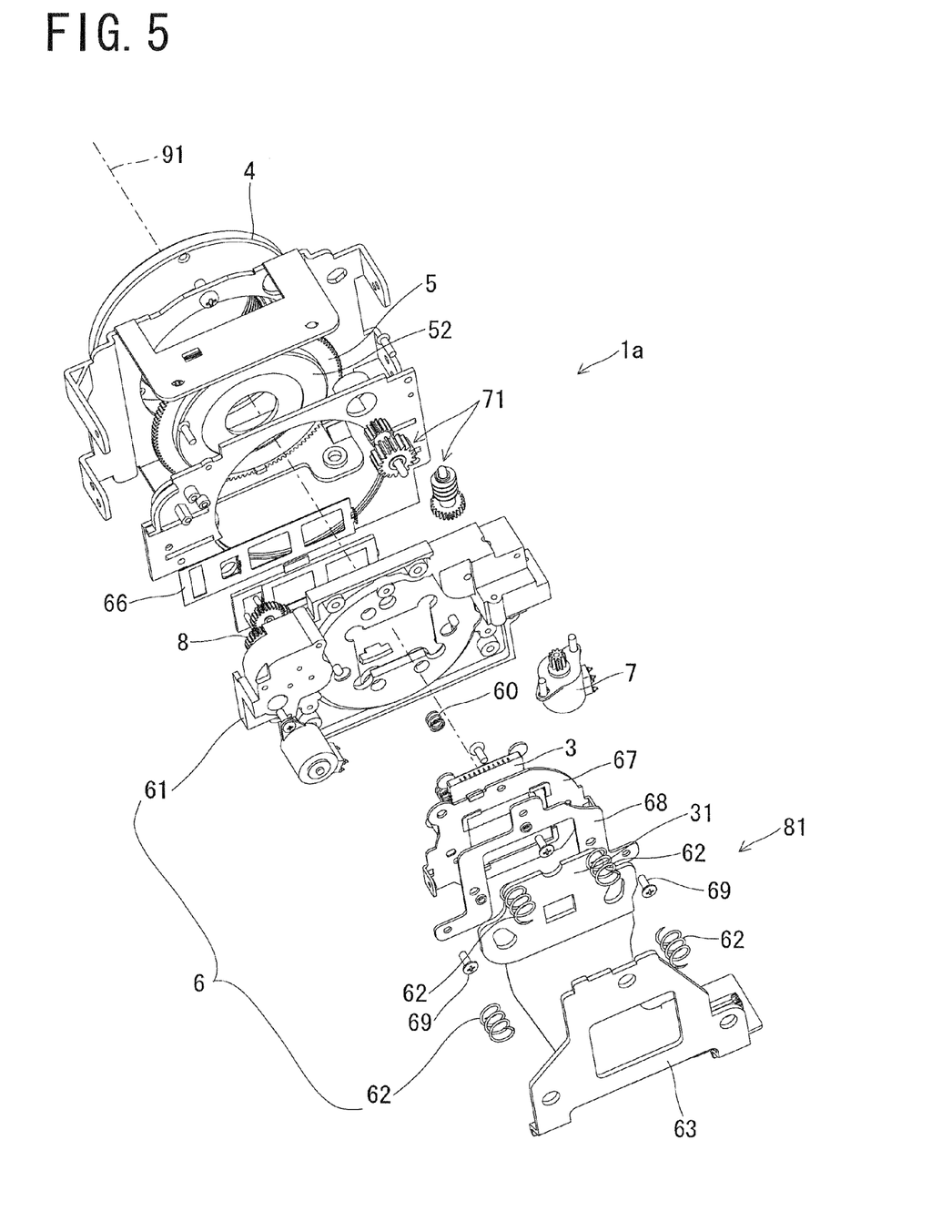
FIG. 5 is an exploded perspective view of the assembly of the camera body seen from the rear side.

As shown in FIGS. 3 to 5, a ring member 5 which is rotatable about an optical axis 91 of the lens is provided on the rear side of the mount section 4. A spur gear rotating about the optical axis 91 is formed on an outer peripheral part of the ring member 5, and a second male screw part 51 for threadedly engaging with the second female screw part 42 is formed on the front side of the ring member 5.

Figure 7:
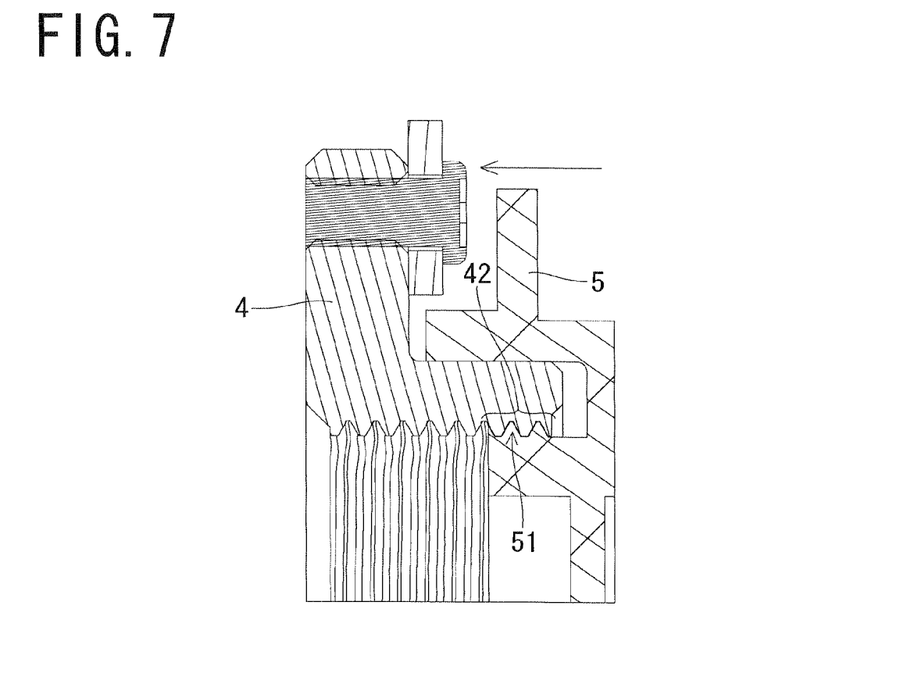
FIG. 7 is a cross sectional view showing the back focus adjustment mechanism with a ring member advanced therein.
Figure 8:
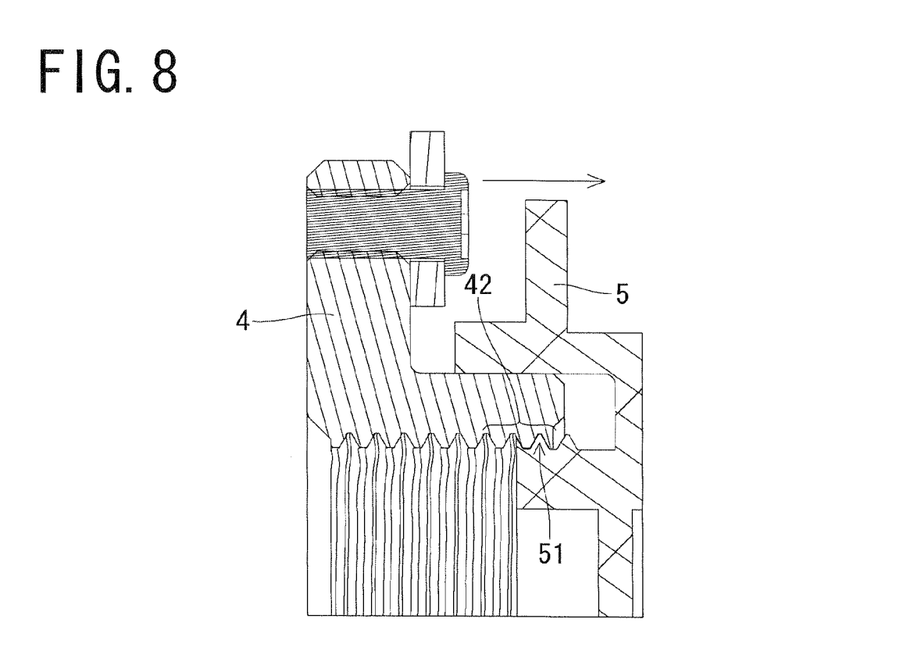
FIG. 8 is a cross sectional view showing the back focus adjustment mechanism with the ring member retracted therein.

Therefore, by rotating the ring member 5 in a rotation direction in which the second male screw part 51 is screwed into the second female screw part 42, the ring member 5 advances as shown in FIG. 7. In contrast, by rotating the ring member 5 in a rotation direction opposite to the above mentioned rotation direction, the ring member 5 retracts as shown in FIG. 8.

As shown in FIGS. 3 to 5, a chassis 61 which is movable along the optical axis 91 is arranged on the rear side of the ring member 5. The chassis 61 is urged toward the ring member by a plurality of compression springs 62 supported on a plate 63 to be fixed to the camera body 1.

The CMOS image sensor 3 is mounted on a substrate 31 at a position on the optical axis 91. Two sheet metal members 67, 68 are fixed to the substrate 31 to form a sensor unit moving together at the time of shift and tilt adjustment to be discussed later. Three screws 69 pass through an outer peripheral part of one of the sheet metal members 68 from the rear side, such that tip end parts of the screws 69 threadedly engage with the chassis 61. Also, three springs 60 intervene between the sheet metal member 68 and the chassis 61. The two sheet metal members 67, 68 can be formed as one sheet metal member.

Therefore, posture of the CMOS image sensor 3 can be adjusted by adjusting screw-in amount of the three screws 69 into the chassis 61. Thus, the chassis 61, the sensor unit, the three screws 69, and the three springs 60 form a shift and tilt adjustment mechanism 81 for adjusting shift and tilt angle of the CMOS image sensor 3.

A cylindrical engagement portion 52 whose center is on the optical axis 91 projects on a rear surface of the ring member 5 as shown in FIGS. 3 and 5, and an engagement receiving part 64 to be engaged with the engagement portion 52 of the ring member 5 is provided in a front surface of the chassis 61 as shown in FIGS. 3 and 4. As shown in FIG. 3, an inner peripheral surface of the engagement receiving part 64 is in sliding contact with an outer peripheral surface of the engagement portion 52. Therefore, the engagement portion 52 of the ring member 5 and the engagement receiving part 64 of the chassis 61 can rotate relative to each other around the optical axis 91 while being engaged with each other.

Since the chassis 61 is urged toward the ring member 5 by the compression springs 62 as described above, in either case of advancing and retracting of the ring member 5 due to the rotation of the ring member 5, engagement of the engagement portion 52 of the ring member 5 and the engagement receiving part 64 of the chassis 61 is maintained by urging force of the compression springs 62. Therefore, the position of the chassis relative to the ring member 5 does not change, and as a result, the CMOS image sensor 3 mounted on the chassis 61 is held at a position retracted from the ring member 5 by a predetermined distance toward the rear side.

Figure 6:
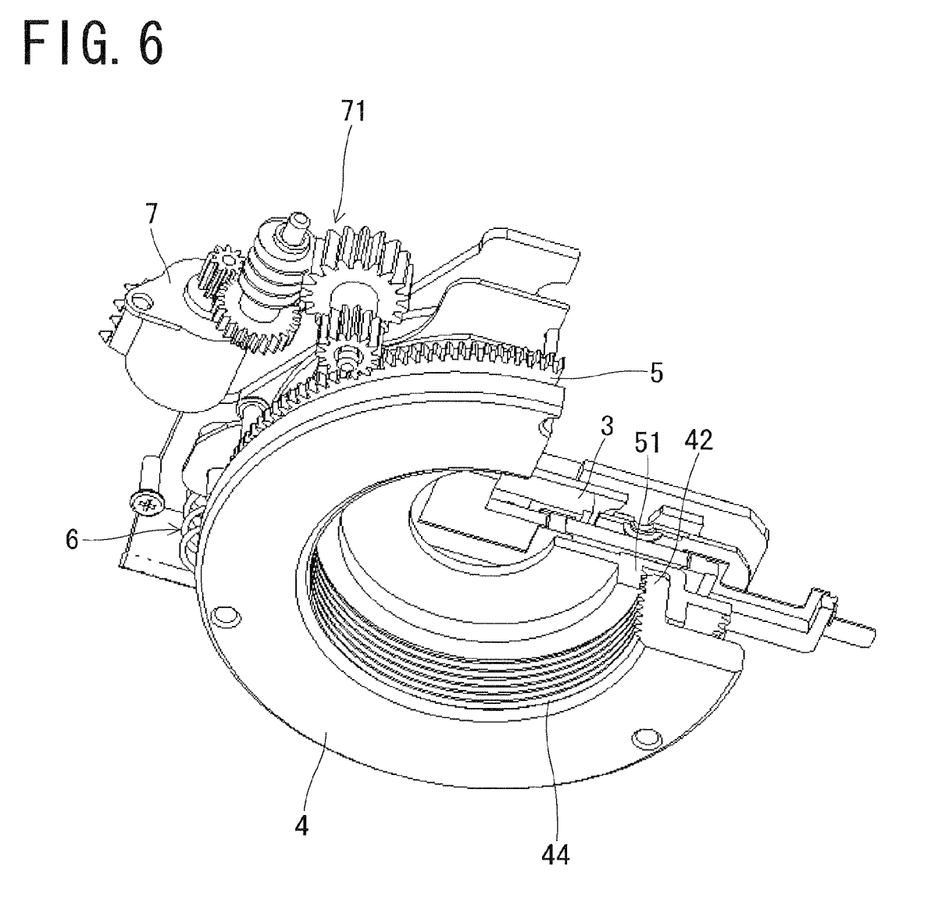
FIG. 6 is a partially cut away perspective view of a back focus adjustment mechanism to be arranged on the assembly of the camera body.

Thus, the chassis 61 and the plurality of compression springs 62 form a holding mechanism 6 for holding the CMOS image sensor 3 at a position retracted from the ring member 5 by a predetermined distance toward the rear side. As shown in FIGS. 3 and 6, the second female screw part 42 formed on the rear side of the mount section 4, the ring member 5, and the holding mechanism 6 form the back focus adjustment mechanism.

In the back focus adjustment mechanism, the ring member 5 advances as shown in FIG. 7 or retracts as shown in FIG. 8 due to the rotation of the ring member 5 as described above. In contrast, since the CMOS image sensor 3 is held at a position retracted from the ring member 5 by a predetermined distance toward the rear side, the CMOS image sensor 3 advances or retracts following the advancing or retracting of the ring member 5. Therefore, it is possible to adjust the distance between the lens of the lens unit 2 and the CMOS image sensor 3, i.e. back focus, by rotating the ring member 5.

The chassis 61 which is mounted with the CMOS image sensor 3 is further mounted with a motor 7 and a gear mechanism 71 which transmits rotational force of the motor 7 to the spur gear formed on the ring member 5.

In a structure in which the ring member 5 is driven by the motor 7 in this way, a position of the ring member 5 changes along the optical axis 91 in accordance with rotation angle of the motor 7, and as a result, a position of the CMOS image sensor 3 also changes along the optical axis 91. That is, the position of the CMOS image sensor 3 changes along the optical axis 91 in accordance with the rotation angle of the motor 7. Therefore, it is possible to adjust the back focus by adjusting the rotation angle of the motor 7.

Also, as shown in FIG. 4, the chassis 61 is provided on its front surface with a guiding groove 65 which overlaps the engagement receiving part 64. The guiding groove 65 has such a depth that there is a space between the engagement portion 52 of the ring member 5 and a bottom surface of the guiding groove 65 when the engagement portion 52 engages the engagement receiving part 64. As shown in FIG. 3, the guiding groove 65 is provided with a sliding member 66 in the space defined between the bottom surface of the guiding groove 65 and the engagement portion 52, and the sliding member 66 can slide along the guiding groove 65 in a direction perpendicular to the optical axis 91.

As shown in FIG. 4, the sliding member 66 is provided with an infrared blocking filter 671 and a dummy glass plate 672 arranged next to each other along a sliding direction, and a light transmitting window 673 arranged next to the dummy glass plate 672. The chassis 61 is provided with a slide driving mechanism 8 which drives the sliding member 66 reciprocatingly along the guiding groove 65 using a motor 72 as a power source.

By being driven by the slide driving mechanism 8, the sliding member 66 reciprocates among a day photographing position where the infrared blocking filter 671 is positioned on the optical axis 91 of the CMOS image sensor 3, a night photographing position where the dummy glass plate 672 is positioned on the optical axis 91 of the CMOS image sensor 3, and a shift and tilt adjustment position where the light transmitting window 673 is positioned on the optical axis 91 of the CMOS image sensor 3, and is set to the three positions selectively.

Figure 9:
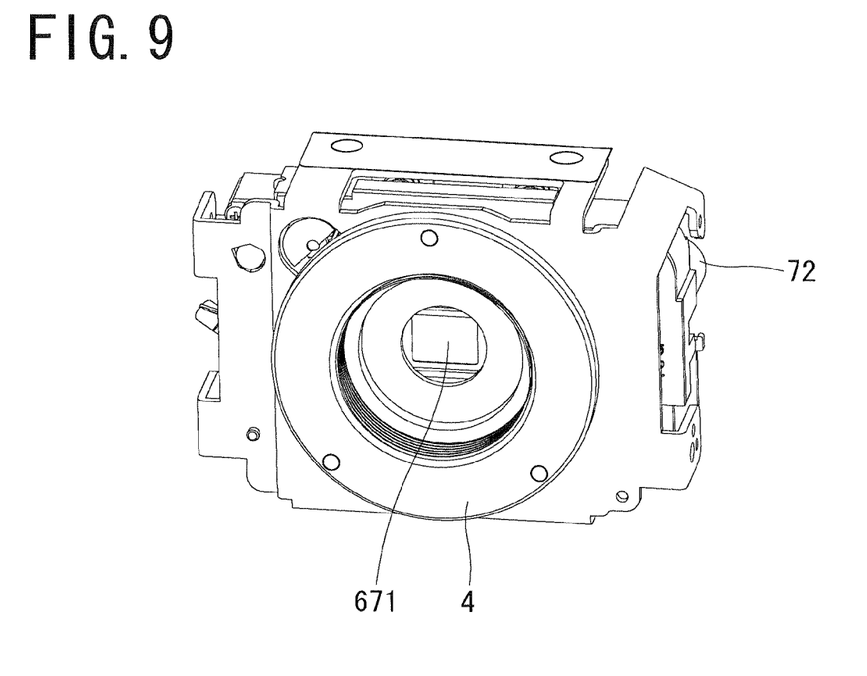
FIG. 9 is a perspective view of the assembly of the camera body set to a day photographing mode.
Figure 10:
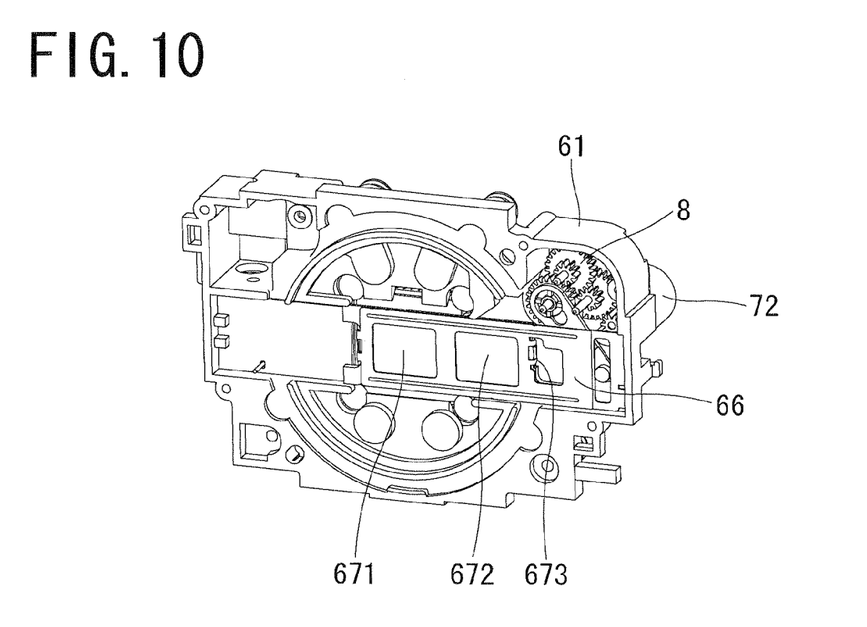
FIG. 10 is a perspective view of the assembly of the camera body set to the day photographing mode without a lens mount section.

When photographing using the monitoring camera 10 in daytime, the light taken in through the lens unit 2 includes visible light and near infrared rays. Therefore, if light is given to the CMOS image sensor 3 without being treated, taken images are reddish. Therefore, in the daytime photographing, the sliding member 66 is set to the day photographing position as shown in FIGS. 9 and 10, and the infrared blocking filter 671 is positioned on the optical axis 91. A day photographing mode is thereby set and near infrared component is removed from the light taken in through the lens unit 2 by the infrared blocking filter 671 before the light enters the CMOS image sensor 3. As a result, images in good condition can be obtained.

Figure 11:
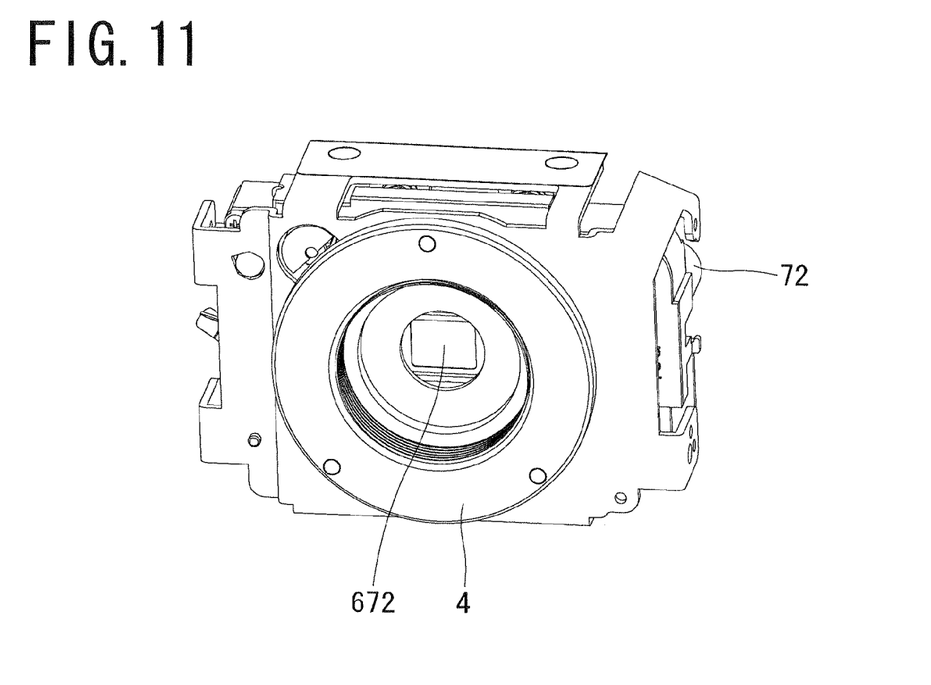
FIG. 11 is a perspective view of the assembly of the camera body set to a night photographing mode.
Figure 12:
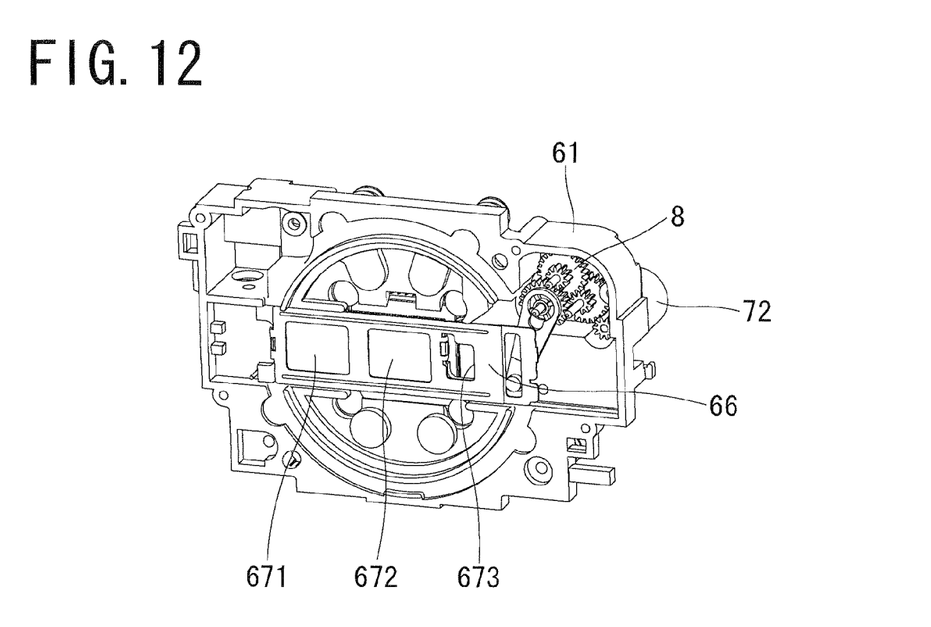
FIG. 12 is a perspective view of the assembly of the camera body set to the night photographing mode without the lens mount section.
Figure 13:
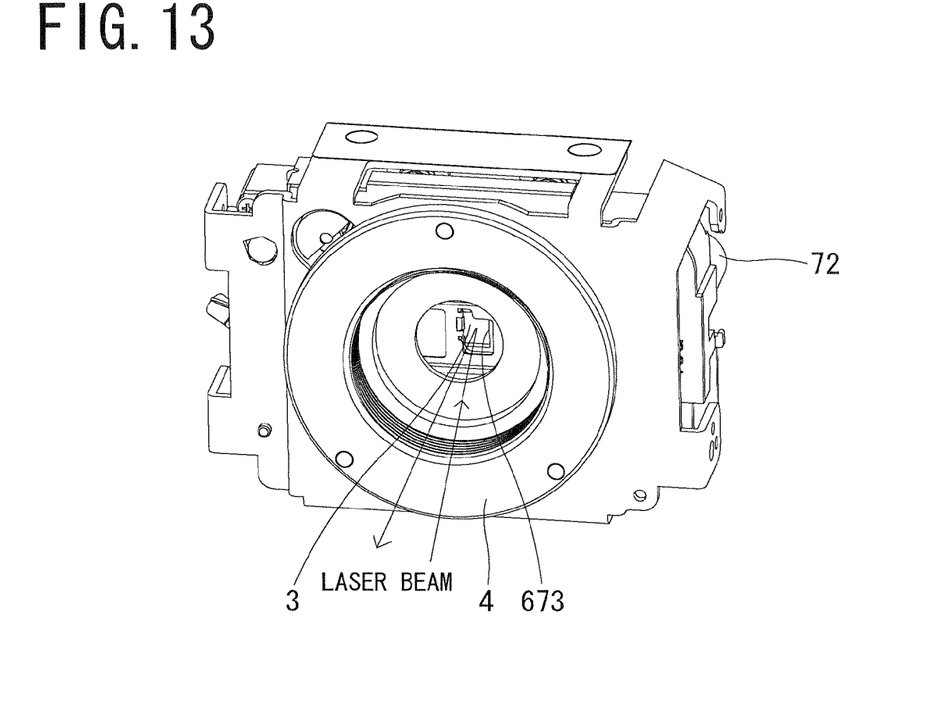
FIG. 13 is a perspective view of the assembly of the camera body set to a shift and tilt adjustment mode.
Figure 14:
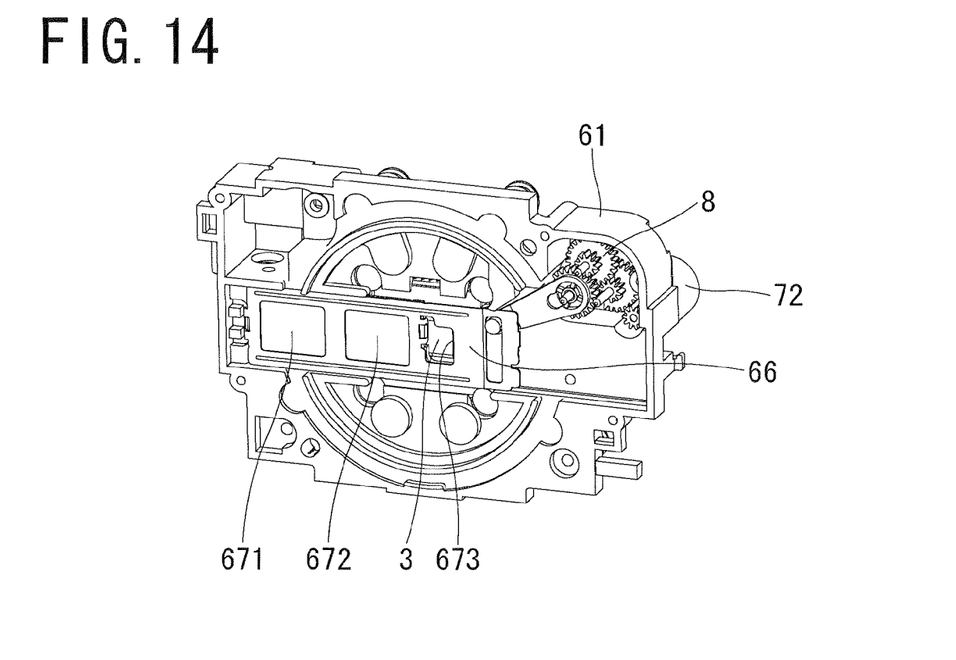
FIG. 14 is a perspective view of the assembly of the camera body set to the shift and tilt adjustment mode without the lens mount section.

In contrast, when photographing in nighttime, the light taken in through the lens unit 2 includes almost no visible light, and therefore, the sensitivity needs to be enhanced. Therefore, in nighttime photographing, the sliding member 66 is set to the night photographing position as shown in FIGS. 11 and 12, and the dummy glass plate 672 is positioned on the optical axis 91. A night photographing position is thereby set, and the light taken in through the lens unit 2 passes through the dummy glass plate 672 to enter the CMOS image sensor 3 without removing the near infrared component. As a result, photographing in a dark place is possible.

In the monitoring camera 10, a thickness t3 of the dummy glass plate 672 is set to be greater than a thickness t2 with which obtained is optical path length extension equivalent to that with the infrared blocking filter 671 having a thickness t1. Therefore, since the dummy glass plate 672 having the thickness t3 intervenes in the optical path, as shown in FIG. 17b, the imaging plane retracts to a position B3 spaced by a predetermined distance from a lens 20 farther than a position B2 of the imaging plane when a conventional dummy glass plate having the thickness t2 intervenes in the optical path.

For example, in a case where the infrared blocking filter 671 is made by two layers of an artificial quartz plate having a thickness of 0.72 mm and a refraction index of 1.548 and a filter plate having a thickness of 0.5 mm and a refraction index of 1.523, the thickness t3 of the dummy glass plate 672 is 1.45 mm, which is greater than the thickness t2 of 1.25 mm, with which obtained is optical path length extension equivalent to 0.426584 mm obtained with the infrared blocking filter 671. Therefore, the optical path length extension obtained with the dummy glass plate 672 is 0.493977 mm, and an optical path difference between the infrared blocking filter 671 and the dummy glass plate 672 (a distance between the positions B2 and B3 of the imaging plane shown in FIG. 17b) is about 0.07 mm.

In the monitoring camera 10 described above, back focus adjustment at the time of switching from the day photographing mode to the night photographing mode is performed by moving an imaging plane position from a start position of the imaging plane position B1 set in the back focus adjustment in the day photographing mode in a direction away from the lens. In this process of moving the imaging plane position, the imaging plane position passes through the actual imaging plane position with the dummy glass plate 672 having a thickness t3, and the most suitable back focus adjustment value is obtained at that point.

Figure 15:
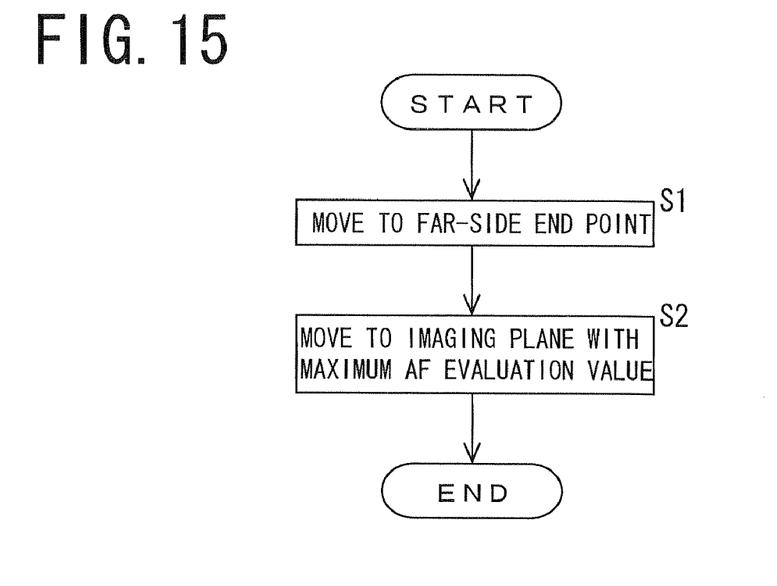
FIG. 15 is a flow chart showing a back focus adjustment procedure in the present invention.

FIG. 15 shows a back focus adjustment procedure in the monitoring camera 10. First in step S1, back focus is changed to move the imaging plane position from an origin position (an imaging plane position set in back focus adjustment in the daytime photographing mode) to a FAR-side end point (an end point in a variable range of the back focus farther from the lens). In this process, an AF evaluation value (high frequency component of an image signal output from a CMOS image sensor) is sampled while correlated with a rotation angle of the motor 7 at a constant period. Subsequently in step S2, the imaging plane position is moved to an imaging plane position where the maximum AF evaluation value among sampled AF evaluation values is obtained, and the back focus adjustment procedure ends.

For example, the distance from the origin position to the FAR-side end point is 0.5 mm and moving speed of the imaging plane position is 0.1 mm/s, it takes 5 seconds to complete step S1 of FIG. 15, and 10 seconds to complete step S2, and it takes approximately 10 seconds for back focus adjustment. Thus, the adjustment is completed in about a half of the time required for the conventional back focus adjustment shown in FIG. 16.

In the monitoring camera 10, the back focus adjustment at the time of switching from the day photographing mode to the night photographing mode is performed by moving the imaging plane position from an imaging plane position set in the back focus adjustment in the day photographing mode in one direction as described above, and therefore, the back focus can be adjusted in shorter time than in the conventional camera in which the imaging plane position reciprocates in both approaching and separating directions with the imaging plane position set in the back focus adjustment in the day photographing mode as a center.

The present invention is not limited to the foregoing embodiment in construction but can be modified variously by one skilled in the art without departing from the spirit of the invention as set forth in the appended claims. For example, although the CMOS image sensor 3 is employed as the image sensor in the embodiment described above, various image sensors such as a CCD image sensor can be employed as well as the CMOS image sensor 3.

In the foregoing embodiment, described is a structure with a thicker dummy glass plate in which back focus can be adjusted only by moving the imaging plane position toward the FAR-side. However, it is also possible to employ a structure with a thinner dummy glass plate in which back focus can be adjusted only by moving the imaging plane position toward the NEAR-side.

What is claimed is:

1. An image pickup apparatus comprising an apparatus body including an image sensor built therein, and a lens unit detachably attached to an aperture opening on a front surface of the apparatus body, the apparatus body being provided with a back focus adjustment mechanism and a sliding member which intervenes between the aperture and the image sensor and is slidable in a direction perpendicular to an optical axis of the image sensor, the sliding member being provided with an infrared blocking filter and a dummy glass plate arranged next to each other along a sliding direction, the image pickup apparatus being capable of switching modes between a day photographing mode in which the infrared blocking filter is positioned on the optical axis of the image sensor and a night photographing mode in which the dummy glass plate is positioned on the optical axis of the image sensor, and the dummy glass plate having a thickness t3 greater than a thickness t2 with which optical path length extension equivalent to that with the infrared blocking filter having a predetermined thickness t1 is obtained, wherein a back focus adjustment by the back focus adjustment mechanism at the time of switching from the day photographing mode to the night photographing mode is performed by moving the imaging plane position from a start point which is an imaging plane position set in the back focus adjustment in the day photographing mode to an end point which is further from the lens unit, and the back focus adjustment being performed with a procedure comprising searching an imaging plane position where the maximum focus evaluation value is obtained during said moving.

2. The image pickup apparatus according to claim 1, wherein the back focus adjustment mechanism automatically changes back focus using a motor as a power source.

3. An image pickup apparatus comprising an apparatus body including an image sensor built therein, and a lens unit detachably attached to an aperture opening on a front surface of the apparatus body, the apparatus body being provided with a back focus adjustment mechanism and a sliding member which intervenes between the aperture and the image sensor and is slidable in a direction perpendicular to an optical axis of the image sensor, the sliding member being provided with an infrared blocking filter and a dummy glass plate arranged next to each other along a sliding direction, the image pickup apparatus being capable of switching modes between a day photographing mode in which the infrared blocking filter is positioned on the optical axis of the image sensor and a night photographing mode in which the dummy glass plate is positioned on the optical axis of the image sensor, and the dummy glass plate having a thickness $t_4$ smaller than a thickness $t_2$ with which optical path length extension equivalent to that with the infrared blocking filter having a predetermined thickness $t_1$ is obtained, wherein a back focus adjustment by the back focus adjustment mechanism at the time of switching from the day photographing mode to the night photographing mode is performed by moving the imaging plane position from the start point which is an imaging plane position set in the back focus adjustment in the day photographing mode to the end point which is nearer from the lens unit, and the back focus adjustment is performed with a procedure of searching an imaging plane position where the maximum focus evaluation value is obtained in a process of the moving.

4. The image pickup apparatus according to claim 3, wherein the back focus adjustment mechanism automatically changes back focus using a motor as a power source.

\* \* \* \* \*